United States Patent [19]
Clechet et al.

[11] Patent Number: 6,110,515
[45] Date of Patent: Aug. 29, 2000

[54] METHOD TO PREVENT CONFECTIONERY COLOR BLEED TO AQUEOUS FROZEN MEDIA

[75] Inventors: Olivier M. Clechet, Saverne; Michel Flambeau, Ilkirch, both of France; Laurie Winward, Chicago, Ill.

[73] Assignee: Mars Incorporated, McLean, Va.

[21] Appl. No.: 09/143,978

[22] Filed: Aug. 31, 1998

Related U.S. Application Data

[60] Provisional application No. 60/075,170, Feb. 19, 1998.

[51] Int. Cl.[7] .................................. A23G 9/24; A23G 3/00
[52] U.S. Cl. ........................... 426/306; 426/99; 426/100; 426/101; 426/103; 426/565; 426/572; 426/660
[58] Field of Search ..................................... 426/100, 101, 426/103, 99, 249, 262, 306, 565, 631, 603, 572, 660

[56] References Cited

U.S. PATENT DOCUMENTS

| | | | |
|---|---|---|---|
| 4,353,927 | 10/1982 | Lovercheck | 426/101 |
| 4,397,881 | 8/1983 | Crothers | 426/565 |
| 4,427,703 | 1/1984 | Schäfer et al. | 426/101 |
| 4,560,563 | 12/1985 | Tresser | 426/101 |
| 4,661,359 | 4/1987 | Seaborne et al. | 426/89 |
| 5,085,877 | 2/1992 | Youcheff et al. | 426/100 |
| 5,171,599 | 12/1992 | Weber | 426/549 |
| 5,401,518 | 3/1995 | Adams et al. | 426/89 |
| 5,468,509 | 11/1995 | Schlup et al. | 426/548 |
| 5,482,728 | 1/1996 | Tapfer et al. | 426/565 |
| 5,500,233 | 3/1996 | Youcheff et al. | 426/89 |
| 5,647,905 | 7/1997 | Bertrand et al. | 118/16 |

FOREIGN PATENT DOCUMENTS

| | | |
|---|---|---|
| 0183595 | 6/1986 | European Pat. Off. |
| 0451491 | 10/1991 | European Pat. Off. |
| 0542510A1 | 5/1993 | European Pat. Off. |
| 0664959 | 8/1995 | European Pat. Off. |
| 777968A1 | 6/1997 | European Pat. Off. |
| 59-059149 | 4/1984 | Japan |
| 2084445A | 4/1982 | United Kingdom |
| 2263615A | 8/1993 | United Kingdom |

| | | |
|---|---|---|
| WO93/14644 | 8/1993 | WIPO |
| 97/15198 | 5/1997 | WIPO |

OTHER PUBLICATIONS

D. Werner, Susswaren Technik Und Wirtschaft, 38(5), pp. 14–16 (1994).
Dairy Field, Oct. 1996, p. 38.
Food Engineering International, Oct. 1995, p. 82.
Food Tech Europe, Jun./Jul. 1996, pp. 40–44.
Packaging Week, Jul. 18, 1996, pp. 28–29.
Advertising Handout of Branded Toppings from TR Toppers, Inc.
B. Biquet and T.P. LaBuza, "Evaluation of the Moisture Permeability Characteristics of Chocolate Films as an Edible Moisture Barrier", J. Food Science, vol. 53(4), pp. 989–998 (1988).
W. Landman, N.V. Lovegren, and R.O. Fenge, "Permeability of Some Fat Products to Moisture", J. American Oil Chemists' Society, vol. 37, pp. 1–4 (1960).
P.J. Tiemstra and J.P. Tiemstra, "Moisture Transmission Through Peanut Oil Films", Peanut Science, pp. 47–50 (1975).
N.W. Kempf, "The Conging Process—Tests on the Moisture Barrier Properties of Coatings", The Manufacturing Confectioner, Jul. 1967, pp. 38–40.
R. W. Faulkner, "Cocoa Butter Equivalents are Truly Specialty Vegetable Fats", The Manufacturing Confectioner, May 1981, pp. 56–61.
J. Flanyak, "Panning Technology: An Overview", The Manufacturing Confectioner, Jan. 1998. pp. 65–74.
*Lipid Technologies and Applications*, by F.D. Gundstone and F.B. Padley, Marcel Dekker, New York, 1997, "Chocolate and Confectionery Fats", pp. 391–432.

*Primary Examiner*—Keith D. Hendricks
*Attorney, Agent, or Firm*—Fitzpatrick, Cella, Harper & Scinto

[57] ABSTRACT

A substantially transparent layer of cocoa butter or equivalent thereof on a confection, surrounded by an aqueous medium, prevents color bleeding from the confection into the aqueous medium and inhibits deterioration of the confection caused by the aqueous medium.

19 Claims, No Drawings

METHOD TO PREVENT CONFECTIONERY COLOR BLEED TO AQUEOUS FROZEN MEDIA

This invention claims the benefit of U.S. Provisional Application No. 60/075,170, filed Feb. 19, 1998.

BACKGROUND OF THE INVENTION

1. Field of the Invention

This invention is directed to confections in an aqueous medium. In particular, the present invention is directed to confections, having a colored sugar shell that can have a design element, included in a matrix of an aqueous frozen, semi-frozen, or semi-solidified medium such as ice cream.

2. Related Background Art

Sugar and sugarless confections having an outer shell are well known. Such shells are often made from sugar or some other water soluble mixture. Further, such shells are also often colored with a government approved food dye. Presently, such shells, when placed in an aqueous medium, are disadvantageously subjected to color migration to the aqueous medium. Further, such shells are disadvantageously subjected to chemical and physical deterioration from the dissolving action of the aqueous medium or a medium of high water activity on the shell. Furthermore, such confections often desirably have design features that should be retained while in the media.

Similarly, other sugar or sugarless confections that do not have a separate, distinct shell structure, nevertheless can have peripheries that contain water soluble components and/or water soluble color components. Such peripheries are also disadvantageously subjected to color migration and deterioration by an aqueous medium or a medium of high water activity.

Frozen or semi-frozen media of high water activity such as slushes, ices, and sorbets are also well known. Such frozen and semi-frozen media include ice cream, sherbet, ice milk, and various other artificial frozen mixtures of high water activity. Well known semi-solidified media of high water activity include puddings and gelatins, and refrigerated doughs.

It is desirable to be able to add sugar or sugarless confections into aqueous frozen and semi-frozen media, or other media of high water activity, as inclusions without deterioration of the confection in the media. Such a combination of the confection with the media desirably adds taste and texture to the media. A very undesirable result of such addition, however, is the bleeding of the color from the shell or periphery of a confection into the media. A second very undesirable result is the deterioration of the physical integrity of the confection caused by the dissolving effect of the media on the confection.

Thus, the mixture of a confection with an aqueous frozen or semi-frozen medium, including into puddings or gelatins, is presently made shortly before the mixture is served to the consumer because mixing at a significant period of time prior to serving would lead to color bleed and dissolution of the shell. It would be very desirable to produce a mixture of a confection with an aqueous frozen or semi-frozen medium that resists color bleeding and confection deterioration because such a product would allow mass commercial production, as pre-packaged goods, with commensurate efficiencies in scale and production costs without the loss of quality.

Previous attempts to prevent color bleeding include the application of fat and fat based coatings, shellacs and glosses. Such prior attempts included trying to protect items such bakery pieces, nutmeats, and confectionery pieces from moisture migration when such items are used as inclusions in ice cream. The coatings formed by these prior attempts, however, were usually 30–50 wt % of the finished item. Furthermore, the prior art coatings disadvantageously changed the appearance of the inclusion particle. Such appearance changes include those changes resulting from flaking of the coatings, from increased opacity in the coatings, and from uneven, coarse or globular coatings. It would be desirable to maintain the original appearance of the inclusion particle by providing coatings that are substantially transparent.

D. Werner, Susswaren Technik Und Wirtschaft, 38 (5), pgs. 14–16 (1994), studied the bleeding of color from dragees and other decorations onto the surface of cakes and flour confectionery. The mechanism of wash-out, whereby moisture penetrates the surface of the dragees and dissolves some of the coloring agent is described. The principal solutions offered were the use of water insoluble coloring agents or the application of a barrier between the coloring agent and the surface of the product.

P. Pitt, Packaging Week, 12 (10), pgs. 28–29 (1996), describes edible cellulose films modified by edible plasticizers. The thus modified cellulose films are soluble in hot water. The described edible films are particularly applicable to layered products such as trifles and cheese cakes. The layers of edible film are designed to prevent the migration of color stains between the layers.

G. Talbot, Food Tech Europe, 3(2) 40, pgs. 42–44, (1996), discusses oils and fats used in ice creams and chocolate type coatings for ice cream. For coatings, alterations to cocoa butter, butter fat and vegetable fats, and moisture barriers are considered. "Lipid Technologies and Applications" by F. D. Gundstone and F. B. Padley, Marcel Deckker, New York, 1997 pgs. 391–432, describes chocolate and the manufacture and composition of confectionery fats such as cocoa butter, cocoa butter equivalents, milk fat, hydrogenated fats and oils, liquid oils, and various other confectionery fats. Methods of characterizing melting and crystallization behavior are described. Other applications of confectionery fats are briefly described and include toffee fats, biscuit cream fillings, ice cream coverings, center filling fats, and moisture barriers.

British Patent No. 2084445 describes an open ended or tubular wafer with an internal fat based coating and filled with ice cream. The ends of the wafer are capped with chocolate. U.S. Pat. No. 4,427,703 describes a composite ice confection formed from an open ended wafer with an internal fat based coating that is filled with ice cream. A continuous fat based capping such as a chocolate type couverture covers the open ends of the wafer.

U.S. Pat. No. 5,647,905 describes coating ice-confectionery products with a fatty composition followed by a coating of dry particulate material such as cereal flakes. The fatty composition acts as a moisture barrier to maintain the particulate material's shape and crispness.

U.S. Pat. No. 5,500,233 describes a process to improve the adhesion of a fat based coating to a frozen fat based confection, such as ice cream. An interfacial layer made of a polysaccharide, such as hydrolyzed starch, and a carrier, such as water, is applied to the frozen confection. The interfacial layer increases the adhesion of the coating and reduces the potential of the coating cracking and falling off during eating, without changing the quality, taste, texture, or appearance of the product.

An article in Dairy Field, (October 1996), page 38, describes reduced calorie coatings containing a fat replacement component manufactured by Cultor (New York, N.Y.). The coatings are supplied in a variety of flavors and can be used to cover ice cream and novelty inclusions. An article in Food Engineering International (October 1995), pg. 82, describes a specialty fat, Cotebar, made by Loders Croklaan (Hoffman Estate, Ill.) that provides a barrier to prevent migration of moisture from toppings and fillings to layers of dry food such as pastry and wafers. The specialty fat is particularly suitable for use in quiches, desserts, pizzas, and ice cream products.

European Patent Publication EP 624061 A1 and British Patent No. GB 2263615 A describe a bar shaped frozen confection made of a layer of ice cream, a layer of chewy confection material, and a layer of crisp confection material enrobed with a moisture barrier material.

U.S. Pat. No. 5,401,518 describes an emulsion that forms an edible moisture barrier coating prepared by homogenizing an aqueous solution of a protein isolate with a mixture of a saturated lipid and emulsifier. The coating is suitable for use as a moisture barrier to treat almonds incorporated into ice cream.

U.S. Pat. No. 5,085,877 describes a method for improving the adherence of fat based coatings to frozen fat based confections by applying a composition formed from a polysaccharide and a suitable carrier as an interface layer between the frozen fat based confection and the coating.

U.S. Pat. No. 4,661,359 describes edible film coating compositions of low moisture permeability. The compositions are formed from cross-linked refined shellac and hydroxypropyl cellulose (HPC). The coating compositions are useful as moisture barriers in composite food articles having phases in contact which defer in water activity. Effective film thicknesses range from 0.1 to 5 mils.

U.S. Pat. No. 4,353,927 describes a matrix of frozen desert having an edible inner bit with a water soluble coating and a substantially water insoluble second coating on it, supported by a frozen state.

U.S. Pat. No. 5,482,728 describes a frozen composition containing particles having a sweetener core encapsulated in a butter fat coating.

U.S. Pat. No. 4,560,563 describes a composite frozen confection product having ice confection material in contact with a layer of fat based coating confection. The fat based coating confection is a suspension of flavoring and sweetening solids in a fat component.

European Patent Publication No. EP 777968 A describes a process for preserving fruit by coating the fruit with a sugary composition having a low pH and pasteurizing the mixture under high pressure. The preserved fruit is useful as an ingredient in the preparation of food products such as pastries, yogurts, and ice cream.

European Patent Publication No. EP 542510 A describes a coloring agent in a thermal stable matrix based on at least partially gelatinized starch material.

Japanese Patent Publication No. JP 59059149 A describes a method to use water-in-oil type emulsions for coating, decorating and filling ice creams.

It would be desirable to form a glossy, transparent, protective coating on an item for inclusion in an aqueous medium to protect the item from the moisture of the aqueous medium and that maintains the original appearance of the inclusions. The deleterious effects of the moisture include causing color bleeding and physical deterioration of the item.

Further, it would be desirable to form the protective coating, while retaining and maintaining any printed designs that are on the item, to protect the item from the moisture of the aqueous medium. Such designs can serve decorative and/or marking functions, for aesthetic purposes and/or tradedress/trademark protection purposes.

SUMMARY OF THE INVENTION

An edible product of the present invention comprises at least a first portion having a water soluble outer periphery, a second portion composed of an aqueous mixture, and a layer composed substantially of cocoa butter or equivalents thereof between the outer periphery and the second portion effective to inhibit deterioration of the periphery by the second portion.

An edible product of the present invention comprises at least a first portion having a water soluble outer periphery having a design portion, a second portion composed of an aqueous mixture, and a layer composed substantially of cocoa butter or equivalents thereof between the outer periphery and the second portion effective to inhibit deterioration of the periphery by the second portion.

An edible product of the present invention comprises at least a first portion having a water soluble outer periphery, wherein the periphery includes a water soluble colorant, a second portion composed of an aqueous mixture, and a layer composed substantially of cocoa butter or equivalents thereof between the outer periphery and the second portion effective to inhibit migration of the colorant to the second portion.

An edible product of the present invention comprises at least a first portion having a water soluble outer periphery, wherein the outer periphery includes a water soluble colorant and a design portion, a second portion composed of an aqueous mixture, and a layer composed substantially of cocoa butter or equivalents thereof between the outer periphery and the second portion effective to inhibit migration of the colorant to the second portion.

The present invention is also directed to a method to inhibit deterioration of a water soluble confection immersed in an aqueous medium comprising the steps of forming a layer of cocoa butter or equivalents thereof on the periphery of the confection.

Another embodiment of the present invention is directed to a method to inhibit deterioration of a water soluble confection, having a design portion, immersed in an aqueous medium comprising the step of forming a layer of cocoa butter or equivalents thereof on the periphery of the confection. The layer is formed under low abrasion conditions effective to inhibit deterioration of the design portion.

Yet another embodiment of the present invention is directed to a method to inhibit migration of a water soluble colorant, to an aqueous medium, from the periphery of a confection immersed in the aqueous medium comprising the step of forming a layer of cocoa butter or equivalents thereof on the periphery of the confection. A preferred method of the present invention includes forming the layer under low abrasion conditions effective to inhibit deterioration of a design portion of the periphery.

Yet another method of the present invention prevents migration of a water soluble colorant, to an aqueous medium, from a periphery of a confection having a design portion, when the confection is immersed in the aqueous medium. The method forms a plurality of sequential layers composed substantially of cocoa butter or equivalents thereof on the periphery. Each of the layers is formed by applying cocoa butter or equivalents thereof to the confection while the confection is in agitation. At least one earlier layer is formed while the confection is in lower agitation than the agitation of the confection during the formation of a later layer. A preferred embodiment includes forming the earlier layers while the confection is in a lower agitation, and forming the later layers while the confection is in a higher agitation.

A significant aspect of this invention is that the original appearance of the confectionery pieces is maintained after the application of the layer of cocoa butter or equivalents thereof. Maintaining the appearance of the pieces while achieving an effective moisture barrier to an aqueous medium such as ice cream provides a highly desirable product.

An "aqueous medium," as used herein refers to a mass that has substantial water activity, that has a free water component, or that will dissolve substances that themselves will dissolve in free water.

A "design portion," as used herein refers to a design that is visible on the periphery of a confectionery item. The design can be any convenient form such as, for example, a printed shape, an imprinted shape, an embossed shape, a raised shape, or a deposited shape. The design portion can be an area having a different composition, texture, reflectance, dimension, or other physical or chemical property from a proximate portion of the periphery.

A standard measure of the aqueous component of a material is its water activity. Water activity is a well known term that is the ratio of the vapor pressure of a material to the vapor pressure of pure water at the same temperature. The term is therefore dependent on the equilibrium relative humidity (ERH). The equilibrium relative humidity is defined as the ratio of the partial pressure of water vapor in the air to the vapor pressure of pure water at the same temperature.

The present invention provides a barrier against media having high water activity values, including water activity values 0.70 or above. It is understood that the present invention is effective for materials having water activity values 0.70 or below because such materials are less aggressive in causing color migration or deterioration.

"Cocoa Butter," as used herein, is defined as an oil containing 80 percent symmetrical 2-oleo disaturated triglycerides. These glycerides contain oleic acid in the center position flanked by palmitic and stearic acid. The positioning of the fatty acids with respect to one another is paramount to the unique physical properties of cocoa butter, and its unique application in the processes of the present invention. Examples of cocoa butters used in the present invention include cocoa butters from varying origins such as Malaysian and Brazilian.

"Cocoa Butter Equivalents," as used herein are all-vegetable, non-hydrogenated products containing the same fatty acids and triglycerides as are present in a typical cocoa butter. A survey of the historical development of cocoa butter equivalents was made in R. W. Faulkner, "Cocoa Butter Equivalents are Truly Specialty Vegetable Fats," Manufacturing Confectioner, 61(5), pgs. 56–61 (1981), incorporated herein by reference.

DETAILED DESCRIPTION OF THE INVENTION

The present invention applies a thin, transparent layer of cocoa butter or equivalents thereof onto a confectionery piece effective to serve as a barrier against the water component of an aqueous medium. The cocoa butter layer is effective to inhibit color bleeding into an aqueous solution, a frozen aqueous medium, a semi-frozen aqueous medium, or a semi-solid aqueous medium. The cocoa butter layer is also effective to inhibit deterioration of the confectionery piece that is caused by the dissolving effect of the aqueous component, of the medium, on the confectionery piece.

The confectionery include candies such as, for example, Skittles® brand (M&M/Mars, Inc., Hackettstown, N.J.), Starburst® brand (M&M/Mars, Inc., Hackettstown, N.J.), Twix® brand (M&M/Mars, Inc., Hackettstown, N.J.), and M&M's® brand (M&M/Mars, Inc., Hackettstown, N.J.) candies. The use of the term "confection" includes cookie pieces and nutmeats. Particularly, preferred confectionery for use in this invention include those having rounded edges, e.g. spherical or lentil shaped, and thus capable of coating in a panning process. A highly preferred confectionery is a sugar shelled candy having water soluble colorant(s) in the outer shell.

The aqueous media include ice cream, ices, sorbets, sherbets, slushes, ice milk, puddings, gelatins, and various other artificial aqueous media that may be frozen or partially frozen as well as refrigerated and room temperature items such as refrigerated doughs and foods in aseptic packaging.

U.S. Provisional Patent Application No. 60/075,170, filed Feb. 19, 1998, incorporated herein by reference, describes how the flavor, color, texture, and original appearance of individual inclusion pieces can be maintained in high water activity systems by panning the confectionery pieces in cocoa butter. The process is applicable to any inclusion pieces compatible to cocoa butter.

It was surprisingly discovered that the flavor, color, texture, and original appearance of individual inclusion pieces can be maintained in high water activity systems by panning the confectionery pieces in cocoa butter. The process is applicable to any inclusion pieces compatible to cocoa butter. Accordingly, the method of the present invention can be used to preserve the flavor, texture, color, and original appearance of inclusion pieces in high water activity systems.

A particularly desirable advantage to using cocoa butter is that a chocolate product coated with cocoa butter remains within the standard of identity for "chocolate" as defined in 21 CFR § 163. Therefore, such products can continue to be identified to the public as either a "milk or sweet chocolate" or "chocolate product." Other fats or artificial systems would not remain within the standard of identity for chocolate and consequently would require a disadvantageously different identification. Another significant advantage of cocoa butter is its stability to oxidation compared to other fats.

Pieces of integral material that are used as inclusions in an aqueous media can be considered particles. The composition of the present invention includes at least one particle, each with a coating of cocoa butter, including a plurality of such particles. The particles preferably have a water soluble outer periphery, e.g., a water soluble dye coating. The present invention also includes a composition of an aqueous medium in which at least one particle coated with a coating of cocoa butter is in contact with the medium.

The particle is coated with a thin coating, substantially of cocoa butter or equivalents thereof, effective to inhibit color migration through the cocoa butter coating. The coating is effective to inhibit deterioration of the particle by the aqueous medium. The coating is also effective to inhibit the aqueous medium dissolving a hydrophilic component of the particle. The coating is applied at a level effective to substantially prevent abrasion of the particle during the coating application.

The cocoa butter coating should be thick enough to protect the periphery of the particle. Too thin a coating is ineffective to inhibit color migration and deterioration of the particle. The coating should not be so thick as to affect the appearance of the particle. Too thick a coating loses the original appearance of the particle. A particle that was originally glossy, for example, would disadvantageously become dull from too thick a coating.

The present invention applies cocoa butter to the confectionery pieces, or particles, by adding cocoa butter to the particles while the particles are in any convenient method of agitation such as, for example, by panning or tumbling. Such agitation is generally performed at a fast speed to evenly coat the particles and prevent agglomeration. Furthermore, it is general practice to perform such agitation at even faster speeds because it is believed that such faster speeds lead to more rapid formation of coating layers. It is appreciated, however, that such faster agitation can cause deterioration of design portions of the particles.

Preferably, this invention forms a layer of cocoa butter or equivalents thereof on the particles while agitating the particles at a slower speed, which can be readily determined, effective to maintain the design portions of the particles while also being effective to prevent agglomeration. More than one layer can be applied and formed on to the particle. After the first layer has been formed, it serves to protect the design portions from further deterioration that might be caused by the agitation required for later formed layers. More than one layer can be formed at the slower agitation rate. Subsequent layers can be formed at faster agitation rates as desired.

The layers of cocoa butter over the confectionery pieces, formed by panning the confectionery pieces in cocoa butter at a slower panning rate, i.e. lower rpm, are effective to prevent substantial degradation of design portions of the confectionery pieces. Accordingly, the method of the present invention can be used to preserve the flavor, texture, color, and—particularly, the original appearance—of inclusion pieces in high water activity systems.

In some applications, which are readily determined, more than one layer will be required to protect the design portion. However, high deposit conditions having higher agitation rates are preferred because the layer can be formed faster, with heavier coatings, without agglomeration. Accordingly, one aspect of the present invention agitates the particles faster during the formation of the later layers than the agitation of the particles during the formation of the earlier layers, after the earlier layers have been formed effective to protect the particle. It is apparent that the later layers can be formed at a slower agitation than the earlier layers if so desired.

In any event, the first cocoa butter layer is formed with an agitation sufficiently slow to effectively minimize the friction which causes deterioration of the design portions of the particles.

It is preferred that the cocoa butter coating be about 25 $\mu$m to about 200 $\mu$m in thickness. It is more preferred that the cocoa butter coating be about 30 $\mu$m to about 150 $\mu$m in thickness. It is most preferred that the cocoa butter coating be about 50 $\mu$m to about 100 $\mu$m in thickness.

It is preferred that the cocoa butter coating be about 1 to about 8 wt % of the particle.

The coating can be performed by any convenient process such as, for example, by pouring, by airless spraying, and by slinger spraying.

A preferred method for coating the particles is by panning. The process includes placing the particles in a revolving, air cooled, smooth sided tilted receptacle and spraying the particles with successive doses of a liquid cocoa butter to create a continuous, uniform, solid layer of the cocoa butter around each particle.

It is preferred to maintain the panning room environment at or below 17° C. In one example, air which has been cooled to 9–12° C. is blown into a pan revolving at about 25 revolutions per minute. However, the present invention rotates the pan more slowly for the early layers, effective to prevent deterioration of the design portions of the particles. Liquid cocoa butter at 35° C. is sprayed into the revolving, air cooled pan at a rate that coats the pieces in successive layers. The spray rate, for the example of M&M's® brand pieces, was about 0.60 wt % of the original charge of M&M's® brand pieces per dose, although one of ordinary skill in the art would be able to adjust the spray rate appropriate to the particular particles being sprayed.

It is preferred that the cocoa butter be at a temperature in the range of from about 35° C. to about 38° C. (about 95 to about 98.6° F.) at the time of application. It is most preferred that the cocoa butter be at a temperature of about 35° C. Without being bound by theory, it is believed that at these temperatures, all fatty acid fractions are melted and the temperature is not high enough to crack the candy shells. At higher application temperatures, the M&M's® pieces will undergo cracking of the shells and melting of the chocolate. At lower application temperatures, differing fatty acid fractions of the cocoa butter will not be fully melted and uniform results will not be achieved. This is shown by an analysis of the solid fat content of cocoa butter in Table 1 below:

TABLE 1

| Temperature (° F./° C.) | % Solid | Solid Fat Content |
|---|---|---|
| 50/10 | 76 | Various |
| 70/21 | 73 | fractions of |
| 80/27 | 62 | fatty acids |
| 92/33 | 9 | remain solid |
| 100/38 | 0 | All fatty acid fractions are melted |

The cocoa butter coating is preferably formed by the controlled buildup and solidification of successive layers of cocoa butter on the particles. In one embodiment the cocoa butter is sprayed onto the pieces in successive intervals. It is preferred that each layer be given time to harden before the next layer is applied. The first layer should be applied at a slower rate of agitation that minimizes deterioration of the design portions that might be caused by, for example, abrasion of the particles during coating. After the first layer has been applied and has hardened, the other layers can be applied faster with a faster rate of agitation because the hardened first layer protects the coated particle from subsequent abrasion during the later coating applications.

The total amount of cocoa butter or equivalent thereof applied to the particles to form the finished pieces should be an amount effective to prevent adverse effects from the high water activity of the media on the particles. It is apparent that the coating dose should be effective to form an even coat without inhibiting free movement of the individual particles. It is apparent that such free movement is required in order to form an even coating. When free movement of the particles is inhibited by a coating dose that is too high, problems such as agglomeration, lumping, and uneven-coating of the particles can occur. Further, "freezing" of the pan can disadvantageously occur—that is, the particles can become stationery in relation to the pan.

Preferably, the total amount of cocoa butter applied to form the finished pieces is divided into 6 to 10 doses and applied to the particles in successive intervals. More preferably, the total amount of cocoa butter applied to the finished pieces is divided into 8 to 10 doses and applied to the pieces in successive intervals. In all cases, the first coating should be applied at a rate, and with a rate of agitation of the particles, effective to minimize deterioration of the design portions from, for example, abrasion of the particles during coating before the applied coating has hardened.

Preferably, each dose should be about the same amount of cocoa butter or cocoa butter equivalent. If the doses are not the same, the earlier doses, particularly the first, should be heavy or thick enough to coat the particles sufficiently to protect the particles from the physical treatment from the subsequent doses. The particles are often tumbled between doses or during doses. Accordingly, the early coatings should be heavy or thick enough to protect against abrasion which would dull the surface or remove decorative features from the surface, and should be applied at a rate effective to minimize such abrasion. It is preferred to apply smaller doses than larger doses because larger doses can cause the particles to bind in the pan, leading to uneven coating.

It was found that, for the case of cocoa butter on Mini M&M's® brand candies, that the maximum amount of cocoa butter that can be applied was 10.22 wt % of the Mini M&M's® brand candies before the original appearance was lost.

M&M's® brand candies are graded for defects in the coating by a 1 to 4 point scale. Three categories are rated using the 4 point scale: mottling, roughness, and gloss. Any rating of 4 in any of the categories indicates that the coating is defective. The rating scale is shown in Table 2 below along with the ratings of cocoa butter coated Mini M&M's® brand candies (at less than about 10.22 wt %) and, for comparison, standard M&M's® brand candies.

of creating a free flowing piece that maintains the original color, original appearance, texture and flavor of the original piece. The present invention contemplates the use of a wide variety of fats and/or other compositions that create a moisture barrier in high water activity systems.

Cocoa Butter Equivalents are fats that are formulated to be closely similar to cocoa butter in their physicochemical properties. Cocoa Butter Equivalents such as, for example, Palmy MMS® made by Fuji Vegetable Oil, Inc., (Savannah, Ga.), and Coberine® made by Unilever, Inc., are included in this invention.

EXAMPLES

Example 1, Comparative Example 1, and Comparative Examples 2A and 2B

In Example 1, M&M's® brand candies were coated with a thin, glossy, transparent layer of cocoa butter. The cocoa butter was applied in a liquified form, at a temperature of about 30° C. to about 35° C., to finished (polished and printed) milk chocolate M&M's® brand pieces from a standard production line.

The cocoa butter coating was applied in 8 dose coats. 15 minutes of drying time was allowed between coats. Drying was assisted by a cool air system at approximately 10° C. The cocoa butter formed a coating which added a total of approximately 5 wt % to each M&M's® brand piece. The coatings were of high gloss and were transparent.

Comparative Example 1 were uncoated M&M's® brand pieces. Comparative Example 2A were M&M's® brand pieces coated with approximately 5 wt % partially hydrogenated vegetable oil. Comparative Example 2B were M&M's® brand pieces coated with approximately 5 wt % 76° C. melting point coconut oil.

Color bleed in water was assessed by immersing Example 1, Comparison Example 1, and Comparison Examples 2A and 2B in 21° C. water over time. This evaluated the

TABLE 2

| | Rating Scale | | | | Cocoa Butter Coated Mini M&M's ® | Standard M&M's ® |
|---|---|---|---|---|---|---|
| | 1 | 2 | 3 | 4 | brand candies | brand candies |
| Mottling | No Mottling | Some Mottling | Mottled | Very Mottled | 1 | 1 |
| Roughness | Very Smooth | Somewhat Smooth | Rough | Very Rough | 2 | 1 |
| Gloss | Very High | Somewhat High | Somewhat Low | Low Gloss | 3 | 1 |
| | | | | | Meets | Meets |

As described above, cocoa butter coated Mini-M&M's® brand candies were unacceptable at a coating level above about 10.22 wt %. Approximately at or above that level of coating both the gloss and the roughness were rated 4 on the scale. Further, below approximately that level of coating, the colors were all acceptable.

Although the present invention employs the use of cocoa butter as a coating material, the present invention contemplates that any coating material could be used that is capable robustness of the test pieces in an environment of highest water activity: 100 wt % water. The pieces were evaluated at elapsed time intervals of 0, 5 minutes, 10 minutes, 1 hour, 2 hours, 8 hours, and 24 hours. Scores were assessed to the loss of color observed. A value of 0 indicated no bleed of color; a value of 2 indicated some color loss; a value of 3 indicated increased color loss; and a value of 4 indicated complete color loss. The results are shown in Table 3 below:

TABLE 3

| Time | 0 min. | 5 min. | 10 min. | 1 hour | 2 hours | 8 hours | 24 hours |
|---|---|---|---|---|---|---|---|
| Comparison Example 1 | 0 | 2 | 2 | 3 | 4 | 4 | 4 |
| Example 1 | 0 | 0 | 0 | 0 | 0 | 0 | 2 |
| Comparison Example 2A | 0 | 0 | 2 | 4 | 4 | 4 | 4 |
| Comparison Example 2B | 0 | 0 | 2 | 4 | 4 | 4 | 4 |

Bleed values above 1 are considered unacceptable. As shown in Table 3, a conventional sugar shelled piece exhibited unacceptable color bleed within 5 minutes. The pieces coated with partially hydrogenated vegetable oil or coconut oil exhibited unacceptable color bleed within 10 minutes. By contrast, the present invention showed substantially no color bleed until 24 hours. In this experiment, the "worst case" scenario, that of immersion in water, was explored. Other tests in high water activity systems showed that the robustness of Example 1 lasted longer than 90 days.

Comparative Examples 3–7

Other coating materials were tested. The coatings were applied similarly to the coatings in the above Example 1:

In Comparative Example 3, M&M's® brand pieces were coated with 5 wt % coconut oil;

in Comparative Example 4, M&M's® brand pieces were coated with 5 wt % hydrogenated coconut oils;

in Comparative Example 5, M&M's® brand pieces were coated with 5 wt % fractionated, hydrogenated palm kernel oils;

in Comparative Example 6, M&M's® brand pieces were coated with 5 wt % of a commonly used cocoa butter replacer of triglycerides, manufactured to mimic cocoa butter, made for example, by Fuji (Japan); and in Comparative Example 7, M&M's® brand pieces were coated with 5 wt % of a partially hydrogenated Palm and Palm Kernel oil.

The coating of 5 wt % coconut oil, in Comparative Example 3 resulted in pieces that initially were not free flowing and did not maintain their original appearance. The exterior of the piece did not solidify, thus resulting in an oily piece to the touch. Upon storage, the pieces absorbed the excess oil, resulting in an expansion of the shell, ultimately resulting in cracking.

The coating with 5 wt % hydrogenated coconut oil, in Comparative Example 4 resulted in pieces that were dull in appearance and upon storage, the shells cracked.

The coating with 5 wt % fractionated, hydrogenated palm kernel oils, in Comparative Example 5 resulted in pieces that had a dull, white flaky exterior, that did not maintain the original appearance of the pieces.

The coating with 5 wt % of a cocoa butter replacer, in Comparative Example 6 resulted in a dull, waxy exterior that did not maintain the original appearance of the pieces.

The results of the 5 wt % partially hydrogenated Palm and Palm Kernel oil, in Comparative Example 7 were also similarly poor.

Examples 2 and 3

Pieces were evaluated by coating freshly manufactured M&M's® brand pieces (less than 1 day old) with 5 wt % cocoa butter for Example 2 and coating M&M's® brand pieces that were over 8 weeks old with 5 wt % cocoa butter for Example 3. No difference was observed regarding the flavor, texture, color or appearance of the pieces using new versus aged shells. They were each satisfactory with respect to color migration, and deterioration and maintaining the original appearance of the pieces.

Examples 4–7

In each of the Examples 4–7 below, the coated M&M's® brand pieces were incorporated into ice cream samples to test the pieces' resistance to color bleed and sugar shell deterioration in high water activity environments. The ice cream contained 14 wt % milkfat derived from 74.861 wt % cream, condensed skim milk, and whole milk; 24.79 wt % sugars derived from liquid sucrose and 36 DE corn syrup; 0.349 wt % stabilizers, emulsifiers derived from carrageenan, egg yolk powders, and other minor ingredients.

Example 4

A composition of 3.5 wt % of cocoa butter and 96.5 wt % of pieces of M&M's® brand candies, were combined similar to the method outlined above. The thus formed pieces were stored at −29° C. The resistance to color bleed and sugar shell deterioration was observed to be satisfactory for greater than 6 weeks when thus stored at −29° C.

Example 5

A composition of 3.1 wt % of cocoa butter and 96.9 wt % of pieces of M&M's® brand candies, were combined according to the method outlined above. The resistance to color bleed and sugar shell deterioration was observed to be satisfactory for greater than 6 weeks when stored at −29° C.

Example 6

A composition of 1.7 wt % of cocoa butter and 98.3 wt % of pieces of M&M's® brand candies, were combined according to the method outlined above. The resistance to color bleed and sugar shell deterioration was observed to be satisfactory for greater than 6 weeks when stored at −29° C.

Example 7

A composition of 1.4 wt % of cocoa butter and 98.6 wt % of pieces of M&M's® brand candies, were combined according to the method outlined above. The resistance to color bleed and sugar shell deterioration was observed to be satisfactory for greater than 6 weeks when stored at −29° C.

In each of the above examples 4–7, the cocoa butter coating had a thickness of no less than about 25 microns. The results indicate that each of the resulting formulations was resistant to color bleed and sugar shell deterioration in high water activity systems. It is believed that a minimum layer of cocoa butter is needed that substantially coats the entire surface area of the particle in order to impart resistance to color bleed and sugar shell or periphery deterioration.

Examples 8–10, and Comparative Example 8

Example 8 was formed by the following procedure. 500 lbs. (227 kg) of Mini M&M's® brand candies were loaded into a 56" (1.4 meter) diameter pan. The pan rotation was set at 9 rpm, air flow was 300 cfm at a temperature of 11–15° C. A cocoa butter coating was formed by adding 3.12 lbs. (1.42 kg) cocoa butter at 35° C. to the rotating pan and panning for 15 minutes.

Two more applications of cocoa butter were similarly made by adding 3.12 lbs. (1.42 kg) each and panning for 15 minutes each. Five more coatings were formed, 3.12 lbs. (1.42 kg) each, but with the panning speed raised to 20 rpm. In all cases, each panning step was performed for 15 minutes. The total amount of cocoa butter added was 25 lbs, (11.3 kg) added in eight applications.

Each Mini M&M's® brand candy had a printed "M" symbol that was retained after the above procedure.

Examples 9 and 10 were formed following procedures similar to that of Example 8 except that the initial slower pan speed was 10 rpm and the later faster pan speeds were 26 rpm for Example 9 and 20 rpm for Example 10.

Comparative Example 8 was formed by following the procedures similar to that of Example 8 except that all the pan speeds were 24 rpm.

The results are shown below in Table 4:

TABLE 4

|  | Comparative Example 8 | Example 8 | Example 9 | Example 10 |
|---|---|---|---|---|
| Pan Speed First 3 Coatings | 24 | 9 | 10 | 10 |
| Pan Speed Remaining Coatings | 24 | 20 | 26 | 20 |
| Total Number of Coatings | 10 | 8 | 9 | 8 |
| Pan Charge (lbs) | 286 | 500 | 626 | 500 |
| Results to Design | Lost "M" design | Kept "M" | Kept "M" | Kept "M" |

The composition of the present invention not only has excellent shelf life properties in high water activity systems, but the problem of a reduction in the aesthetics of the product due to color bleed and loss of design portions are substantially eliminated as well as the further problems of sugar shell deterioration and center deterioration. Moreover, the original appearance of the pieces was maintained. In another Example, Mini M&M's® brand candies coated with cocoa butter according to this invention showed no color bleed after more than 28 weeks of inclusion in Ice Cream at −25° C.

When using a coating material other than cocoa butter, it may be necessary to either increase or decrease the amount of coating depending on the flow properties of the material in order to coat the entire surface area of the piece. What is important is that the coating agent forms a suitable uniform and continuous moisture barrier in the high water activity system such that color bleed and sugar shell deterioration is inhibited. This can be readily determined by one of ordinary skill in the art.

Example 11, Comparative Examples 9–11

A Cocoa Butter Equivalent, Palmy MMS®, made by Fuji Vegetable Oil, Inc., (Savannah, Ga.) and a Cocoa Butter Substitute, Palkena H®, also made by Fuji Vegetable Oil, Inc., were tested. Noticeable differences between them were the considerably higher iodine values for Palmy MMS® and the radically different solid fat content/temperature characteristics of each formulation.

Mixtures of each formulation were made with cocoa butter as shown in Table 5 below:

TABLE 5

|  | Mixture (wt./wt.) | Results (Rating) |
|---|---|---|
| Ex. 11 | Palmy MMS/Cocoa Butter 80/20 | Free flowing Somewhat High Gloss (2) No Mottling (1) Somewhat smooth (2) |
| Comp. Ex. 9 | Palmy MMS/Cocoa Butter 50/50 | Mottled appearance (4) |
| Comp. Ex. 10 | Palkena H/Cocoa Butter 80/20 | Free flowing Mottled appearance (4) Low Gloss (4) Very Rough (4) |
| Comp. Ex. 11 | Palkena H/Cocoa Butter 50/50 | Tacky to touch Dull appearance (4) Cracked Shells upon aging |

The coatings were made similarly to the process used in Example 9. The initial slower pan speed was 10 rpm while the faster pan speed was 26 rpm. The air temperature was 15° C. The temperature of the coating mixtures was 35° C. The pan load of Mini-M&M's® brand candies was 25 lb. and each mixture was added to each experiment in 8 potions totaling 1.25 lb. at each 15 min. interval.

As can be seen from Table 5, only Example 11 produced a coating having adequate initial appearance and other physical properties. Accordingly, Comparative Examples 9–11 were not tested for their coatings' effectiveness against color bleed because the coatings failed to pass the initial screening for appearance and other physical properties.

The pieces of Example 11 were tested by inclusion in water (as described above in Table 3) where they did not bleed for over 24 hours and when incorporated into Ice Cream did not bleed for more than 6 weeks.

Example 11 and Comparative Example 9 show that the compatibility, readily determined by one in the art, between the coating components such as, for example, Cocoa Butter Equivalent and Cocoa Butter should be considered in order to prevent mottling of the coating.

The composition of the present invention not only has excellent shelf life properties in high water activity systems, but the original appearance of the pieces is also maintained. Further the problem of a reduction in the aesthetics of the product due to color bleed are substantially eliminated as well as the further problems of sugar shell deterioration and center deterioration.

Although the present invention has been described with reference to the preferred embodiments, workers skilled in the art will recognize that changes may be made in form and detail without departing from the spirit and scope of the invention.

What is claimed is:

1. An edible product comprising:
   at least one confectionery piece having (i) a water soluble outer periphery and (ii) a transparent layer of cocoa butter or equivalents thereof on the outer periphery; and
   a frozen or semi-frozen aqueous medium, wherein at least a portion of said layer of cocoa butter or equivalent thereof contacts said frozen or semi-frozen aqueous medium and is effective to inhibit deterioration of said periphery by said frozen or semi-frozen aqueous medium.

2. An edible product according to claim 1, wherein said at least one confectionery piece includes at least a design portion.

3. An edible product according to claim 1, wherein said edible product comprises a plurality of confectionery pieces.

4. An edible product comprising:
- at least one confectionery piece having (i) an outer periphery, said periphery including a water soluble colorant, and (ii) a transparent layer of cocoa butter or equivalent thereof on the outer periphery; and
- a frozen or semi-frozen aqueous medium, wherein at least a portion of said layer of cocoa butter or equivalents thereof contacts said frozen or semi-frozen aqueous medium and is effective to inhibit migration of said colorant to said frozen or semi-frozen aqueous medium.

5. An edible product according to claim 4, wherein said at least one confectionery piece includes at least a design portion.

6. An edible product according to claim 4, wherein said edible product comprises a plurality of confectionery pieces.

7. A method to inhibit deterioration of a water soluble confection contacting a frozen or semi-frozen aqueous medium, said method comprising:
- forming a transparent layer composed of cocoa butter or equivalents thereof on the periphery of said confection, and incorporating said confection into the frozen or semi-frozen aqueous medium.

8. A method according to claim 7, wherein said forming step is performed at a rate effective to prevent deterioration of a design portion of the periphery.

9. A method to prevent migration of a water soluble colorant, to a frozen or semi-frozen aqueous medium, from a periphery of a confection contacting said frozen or semi-frozen aqueous medium, said method comprising:
- forming a transparent layer composed of cocoa butter or equivalents thereof on said periphery of said confection, and incorporating said confection into the frozen or semi-frozen aqueous medium.

10. A method according to claim 9, wherein said forming step is performed at a rate effective to prevent deterioration of a design portion of the periphery.

11. A method to prevent migration of a water soluble colorant, to a frozen or semi-frozen aqueous medium, from a periphery of a confection having a design portion, when the confection is in contact with the frozen or semi-frozen aqueous medium, said method comprising:
- forming a transparent plurality of sequential layers composed of cocoa butter or equivalents thereof on said periphery, each of said layers formed by applying cocoa butter or equivalents thereof to said confection while said confection is in agitation, wherein at least the first layer is formed while the confection is in lower agitation, and at least one later layer is formed while the confection is in higher agitation, and incorporating said confection into the frozen or semi-frozen aqueous medium.

12. A method according to claim 11, wherein the agitation is provided by panning.

13. An edible product comprising:
- (a) an aqueous media selected from the group consisting of ice cream, ices, sorbets, sherbets, slushes and ice milk; and
- (b) at least one confectionery piece included in said aqueous media, said confectionery piece coated with an effective amount of cocoa butter or equivalent thereof to provide a transparent barrier to water activity of said aqueous media while maintaining an original appearance of said piece.

14. An edible product according to claim 13, wherein said confectionery piece has an outer periphery comprised of a water soluble colorant.

15. An edible product according to claim 14, wherein said confectionery piece is a sugar shelled candy.

16. An edible product according to claim 13, wherein said cocoa butter coating is about 25 $\mu$m to about 200 $\mu$m in thickness.

17. An edible product according to claim 13, wherein a plurality of confectionery pieces are disposed in said aqueous media.

18. An edible product according to claim 17, wherein said confectionery pieces are whole or chopped.

19. An edible product according to claim 18, wherein said aqueous media is ice cream.

* * * * *